J. E. Boyle,
Water-Closet Valve.
No. 1375 Reissued Jan. 6, 1863
Fig. 4.
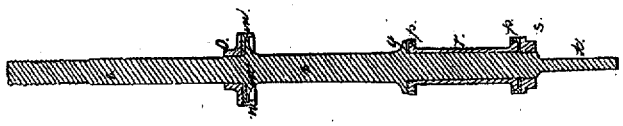
Fig. 3.
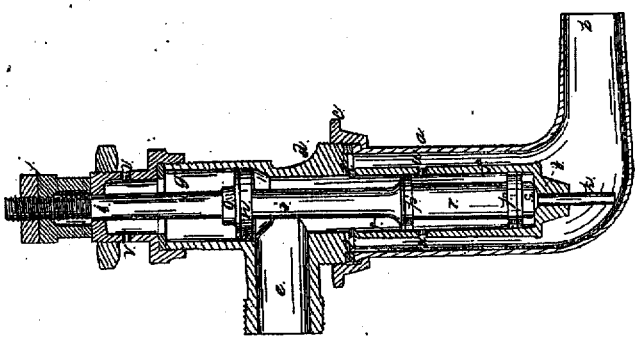
Fig. I.
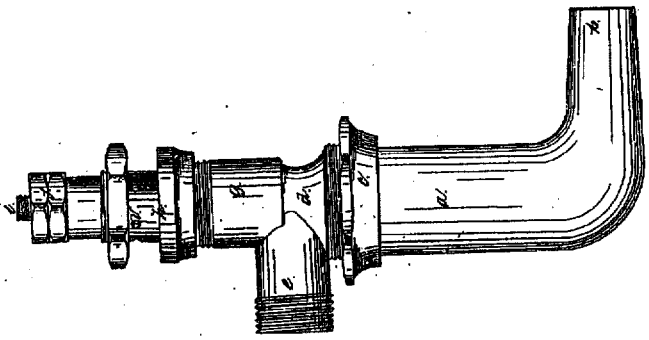
Fig. 2.
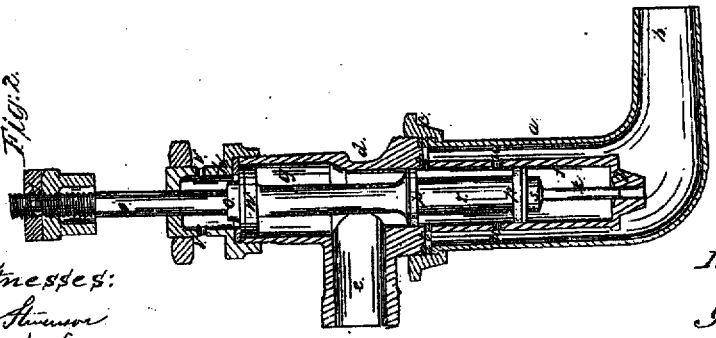
Witnesses:
Geo. Stimson
C. A. Seward
Inventor:
J. E. Boyle by
N. PETERS, PHOTO-LITHOGRAPHER, WASHINGTON, D. C.

UNITED STATES PATENT OFFICE.

JAMES E. BOYLE, OF BROOKLYN, ASSIGNOR TO GEORGE STEVENSON, OF NEW YORK, N. Y.

IMPROVEMENT IN VALVES FOR WATER-CLOSETS.

Specification forming part of Letters Patent No. 26,645, dated January 3, 1860; Reissue No. 1,375, dated January 6, 1863.

*To all whom it may concern:*

Be it known that I, JAMES E. BOYLE, of Brooklyn, Kings county, and State of New York, have invented a new and useful Improvement in the Valves or Supply-Cocks for Water-Closets and other Purposes; and I do hereby declare that the following is a full, clear, and exact description thereof, reference being had to the accompanying drawings, making part of this specification, in which—

Figure 1 is an external view; Fig. 2, a vertical section with the water-ways closed; Fig. 3, a like section with the water-ways opened, and Fig. 4 a section of the valve-stem and valve.

The same letters indicate like parts in all the figures.

Prior to my said invention cocks used for supplying water to water-closets and other pans requiring to be washed out presented serious difficulties. When provided with an elevated reservoir connected with the main water-pipe in the house and with the pan below, such reservoirs are liable to leak, occupy much room, and unless made at great cost the connecting mechanism is very liable to derangement. If the valve be connected with the seat so as to be operated thereby, it is wasteful of water and inconvenient to the occupant, and if made to operate by hand persons using the closet are liable to forget to operate them, and even when operated, on account of the length of time required for the water to descend from the reservoir to the pan, persons in haste frequently let go the handle before it gets down to the pan, in which event the supply is cut off before the pan is cleansed; and with cocks that are not provided with a local reservoir above, and whether operated by connection with the seat or by a handle, when connected with the seat there will be a wasteful and inconvenient flow of water while the seat is depressed, which can only be prevented by the additional expense and inconvenience of another valve to stop the flow of water while the seat is depressed. But there is another and more serious inconvenience with this class, whether operated by the seat or by hand. In all this class the valve or cock is self-closing by a spring or weight as soon as the seat or handle is liberated, and although in most cases such cocks or valves are provided with a mechanism to prevent the too rapid closing, so as to allow what is termed an "afterflow" of water to wash out the pan, experience has proved that this provision is not sufficient, and it often happens that the valve is closed without any discharge of water, thus leaving the pan unwashed.

It is well known that in buildings supplied with water by hydrostatic pressure, as in the city of New York, when water is being drawn in one part of the building the pressure is so much reduced as to cut off the supply for the time being from the other parts of the building; and that it frequently happens that during a fire, when much water is drawn from the street-main, the pressure is so much reduced as to suspend for the time the supply to the upper stories of buildings, particularly in the more elevated parts of the city. In such cases it will be obvious that there will be no supply of water to wash out the pan. It is on this account that the otherwise inconvenient and expensive plan of an elevated local reservoir has been so generally adopted.

All the above inconveniences are avoided by my invention, which consists of the combination of two mechanisms: first, a cock or valve which when opened will remain so until there is a supply of water, and which is closed only by the pressure of the supplying head of water; and, second, a mechanism to retard or prevent it from closing suddenly, that sufficent water may flow through to wash out the pan before the cock or valve is entirely closed. By such a combination the pan is sure to be washed out when the supply of water comes, and this, too, without a wasteful expenditure of water or necessity of the person waiting until the pressure of water returns, and without the inconvenience of a local reservoir.

In the accompanying drawings, *a* represents the induction-pipe, which is to be connected at *b* with any supply-pipe leading from a head of water. The upper end of this pipe *a* is provided with packing and a coupling-nut, *c*, by which it is coupled with the body of the cock *d*; but it may be coupled or connected in any other suitable manner. The body of the cock is provided with a branch or education pipe, *e*, to be coupled in the usual manner to the pipe leading to the pan of a water-closet, or to any other pan with which it may be desired to form the connection. The bore of the body of the cock from the eduction-pipe *e* is cylindrical, and from the point of coupling this cylindrical bore extends some distance down into the induction pipe, as represented at *f*, the external diameter of the said extended part *f* being sufficiently less than the inner diameter of the induction pipe to leave a free passage for water all around. The bore of the body *d* above the eduction-pipe *e* is of greater diameter, as represented at *g*, and the upper end is covered with a screw-cap, *h*, properly packed.

The valve-stem *i* is placed centrally in the body of the cock, with its upper and cylindrical end accurately fitted to slide in a central hole in the cap *h*. Its extreme upper end, if desired, may be threaded, and provided with adjusting-nuts *j*, by means of which its range of downward motion can be readily regulated. The lower end, *k*, of this valve-stem *i* is of smaller diameter, and fitted to slide loosely in a hole made in the center of the bottom *l* of the extension *f* of the cock, and only so loosely as that water may flow through slowly into a chamber, *k'*, in the lower part of the body of the cock *f* below the lower piston, to be presently described; or, instead of leaving sufficient space between the stem and the hole in which it slides, a small hole may be made through this bottom. This stem *i* is flanged at *m* to receive a cup, leather, *n*, which is there secured by a cap-nut, *o*. This cup-leather is made to fit the large bore *g* of the body of the cock. Below this there are two other cup-leathers, *p p*, fitted to the smaller bore in the body and extension *f*, the upper one of these leathers being put against the under face of a flange, *q*, and there held by a thimble, *r*, the ends of which are flanged, and the lower one of these leathers is put under the lower flange of the thimble and there secured by a nut, *s*.

Through the extension *f* of the body of the cock there are two sets of holes, *t* and *u*, for the passage of water from the induction-pipe *a* to the inside of the cock; and the distance between the two cup-leathers *p p* on the stem and the two sets of holes *t* and *u* and the relative positions of these must be such that when the valve-stem is lifted up the upper cup-leather or piston (for as such it acts) shall be above the upper set of holes, *t*, and when the stem is depressed it shall be below the said holes, but never descend to the lower set of holes, *u*, and the lower cup-leather or piston *p* must always be below the lower set of holes, *u*.

The cap *h*, which covers the enlarged part or chamber *g*, is provided with holes *v*. The moment the valve-stem is depressed to the position represented in Fig. 3 the upper piston *p* is below the holes *t*, and then the water will flow freely from the induction-pipe *a* through the holes *t*, through the cock, and out through the eduction-pipe *e*. At the same time the water has free access through the holes *u* to the inside of the extension *f* and between the cup-leathers *p p*, the pressure of the water therein packing the said leathers against the bore of the cylinder, that they may act as pistons, the pressure of the water in opposite directions against the two being thereby balanced. So soon as the stem is liberated, the pressure of the water on the two pistons *p p* being balanced, and the water having access to the inside of the extension *f* through the hole in the bottom or around the stem *k*, acts against the under face of the lower piston *p*, and forces up the stem slowly until the upper piston *p* passes above the holes *t*, which shuts off the further passage of water, and as the hole in the bottom or around the stem *k* is very small the closing motion will be slow, that there may be a flow of water through the cock to the pan after the valve-stem is liberated.

Water is prevented from escaping from the upper end through the hole in the cap *h* by the cup-leather *n*, which acts as a packing; but as this would act as a piston in depressing the valve-stem, and thereby produce a vacuum above, which would seriously resist the downward motion of the stem, the cap is provided with holes *v*, for the passage of air.

If the discharge of water to the pan from the pipe to which the eduction *e* is to be coupled should be smaller than the area of the water-ways in the body of the cock, the pressure of the water flowing through will act against the under face of the cup-leather or piston *n* above the eduction *e*, and as this is of greater area than the piston *p* below, the preponderance of the pressure will be in an upward direction, and tend to close the cock, but no faster than the area of opening between the lower end, *k*, of the valve-stem *i* and the bore of the hole in which it slides in the bottom *l* of the cock, or the small hole provided as a substitute therefor, will permit the water to flow into the chamber *k'* below the piston *p*.

It will be obvious that if the valve-stem were forced up at a greater velocity than the water can flow into the chamber *k'* a partial vacuum would result, and as the pressure of the water could not exercise a sufficient force on the piston *n* to do this, the capacity of the aperture through which water will flow into the chamber *k'* will control the closing, so as to allow sufficient water to flow through to wash the pan before the supply is shut off.

As the pressure of the water between the two pistons *p p* is balanced, and the upper surface of the piston *p* presents a less area to the pressure of the water than the lower surface of the lower piston *p*, as the water slowly enters the chamber *k'* it will exert the requisite pressure to slowly force up the valve-stem and stop the flow of water; and it will be obvious that this difference of area may be increased to any extent to obtain the power required to overcome the friction and inertia of the parts to be moved; but as it is desirable to prevent the escape of water where the upper end of the valve-stem passes out, I employ the cup-leather or piston *p*, or its equivalent, for the double purpose of preventing such leak and to aid in moving the stem to close the water-ways, and thereby avoid the necessity of making the lower piston of an inconvenient size. The object is to present to the action of the inflowing water a surface or surfaces sufficiently greater in the closing than in the opening direction, to enable the pressure of the water, when the supply comes, to close the valve or cock, and to have that power so controlled or retarded, although sufficient to insure the closing, that the required supply of water shall flow through during the operation of closing to insure the washing of the pan. It is this combination of two mechanisms, the one performing the function or operation of closing the valve or cock by the pressure of the water alone, and the other of checking or controlling the closing so that it shall be gradual instead of sudden, which distinguishes my invention from all other things before known, whatever formal variations may be made in the construction of the parts.

What I claim as my invention in cocks or valves for water-closets, and desire to secure by Letters Patent, is—

The valve and its appendages, or the equivalents of them, whose mode of operation is to close the water-ways by the pressure of the supply water only, substantially as described, in combination with the means herein described, or the equivalents thereof, for governing the closing of the valve, so that the water shall flow through to wash the pan before the water-ways are closed, substantially as described.

JAMES E. BOYLE.

Witnesses:
WM. H. BISHOP,
A. DE LACY.